Oct. 14, 1952  J. W. McNAIRY  2,613,630
CONTROL DEVICE
Filed Jan. 22, 1947  2 SHEETS—SHEET 1
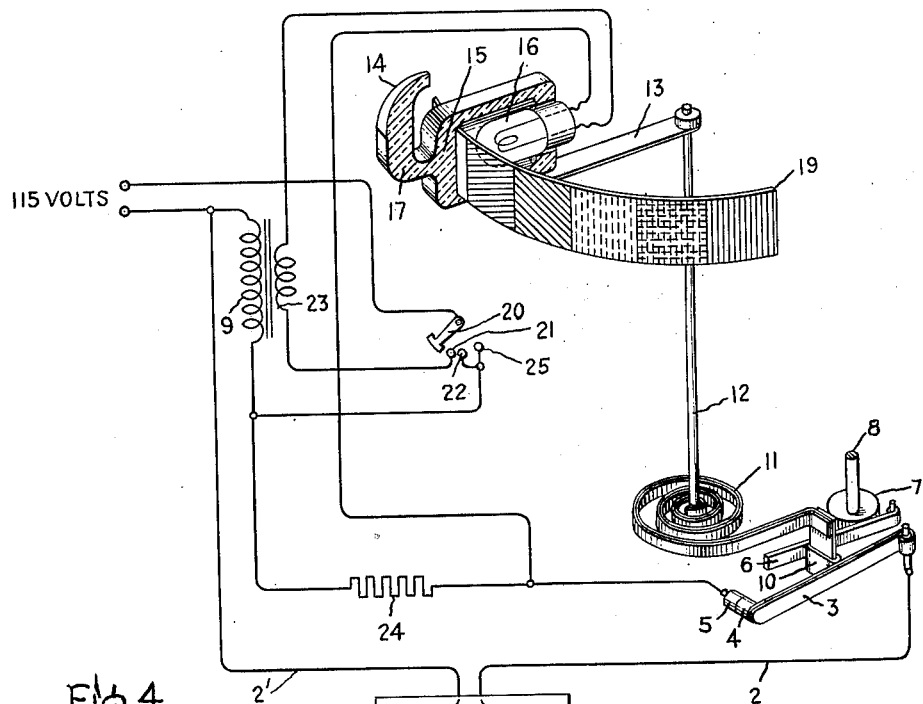
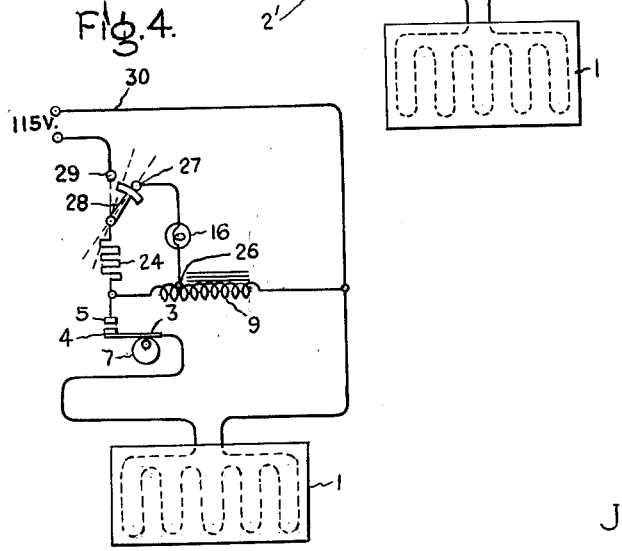
Inventor:
Jacob W. McNairy,
by Alfred E. Bobst.
His Attorney.

Oct. 14, 1952    J. W. McNAIRY    2,613,630
CONTROL DEVICE

Filed Jan. 22, 1947    2 SHEETS—SHEET 2

Inventor:
Jacob W McNairy,
by Alfred E Bobst,
His Attorney.

Patented Oct. 14, 1952

2,613,630

UNITED STATES PATENT OFFICE 2,613,630

CONTROL DEVICE

Jacob W. McNairy, Westport, Conn., assignor to General Electric Company, a corporation of New York Application January 22, 1947, Serial No. 723,549

2 Claims. (Cl. 116—129)

1

The present invention relates to control devices and more particularly to control devices for controlling the operation of a heating circuit so that the heat output of the circuit may readily be varied in small increments from a predetermined minimum to a predetermined maximum.

Still more particularly this invention relates to an illuminated indicator for a control device for an electric circuit. While not limited thereto, this invention is especially useful in the control of electric blankets and similar heating devices in which the energization cycle of the device may be selectively controlled by the operator and is further controlled automatically in accordance with ambient temperature variations.

This invention is an improvement in the control device described and claimed in Patent No. 2,429,475 issued October 21, 1947 in the names of J. W. McNairy, F. A. Rosenkrans, and A. E. Coombs, and assigned to the same assignee as the present invention.

According to the present invention, an illuminated indicator is provided to indicate when the heating device is turned on or off; to indicate by a fluctuation in light intensity when the heating device is cycling properly; and to indicate the selected cycle of operation of the heating device.

Figure 2:
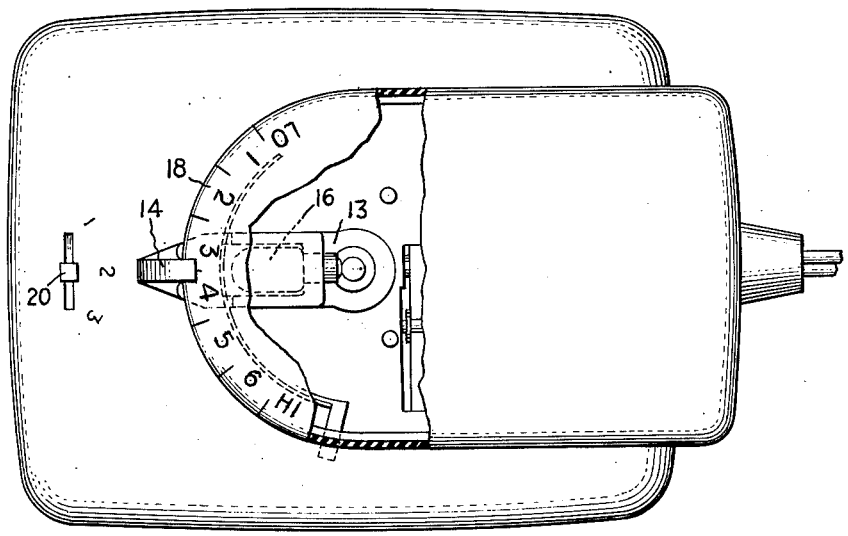
Figure 3:
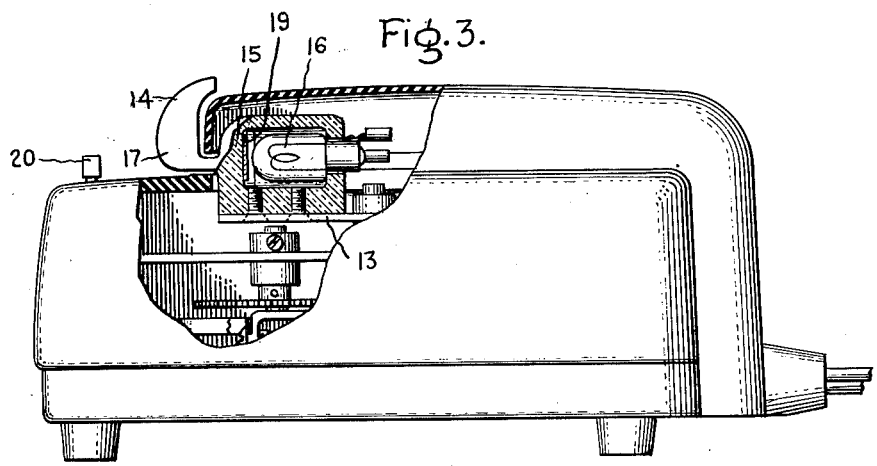

A more complete understanding of the invention will be had from the following description taken in connection with the accompanying drawings in which Fig. 1 is a schematic view of one modification of the invention; Fig. 2 is a plan view of the indicator with a portion broken away to show operating element; Fig. 3 is an elevation of the indicating device with a portion broken away; and Fig. 4 is a diagram of a modification of the operating circuit shown in Fig. 1.

Referring to the drawings, the load device 1, in this case illustrated as an electrically heated blanket is connected to a suitable electric power supply through a contact mechanism which turns the heating element on and off in a periodic cycle as may be selected by the blanket user. The on-off cycle is further automatically controlled by a temperature responsive element in accordance with the ambient temperature in which the temperature responsive element is located. This mechanism is schematically shown in Fig. 1. The blanket 1 is connected by conductor 2 to an arm 3 carrying a contact 4 which cooperates with a fixed contact 5 to close the energizing circuit to the blanket 1. Opening and closing of the contacts 4 and 5 is controlled by means of an auxiliary arm 6 actuated periodically by any suitable means as, for example, by an eccentric cam 7 which may be rotated through shaft 8 by a motor such as, for example, a clock motor having an

2 energizing winding 9. Between the auxiliary arm 6 and the contact arm 3 is a wedge 10 which is movable longitudinally in order to vary the length of time the contacts 4 and 5 are closed during each rotation of the cam 7. The position of the wedge 10 is controlled in accordance with ambient temperature variations by a temperature responsive element 11 mounted at the end of the shaft 12. The position of the wedge, and therefore the heating cycle, may further be controlled by the blanket user by a manual adjustment of the shaft 12. This is accomplished by means of an arm 13 fixed to the shaft 12 and a manually adjustable member and pointer 14 which is secured to the arm 13. Details of the foregoing mechanism are more fully described in Patent No. 2,429,475, referred to above.

Suitable illumination is provided to indicate the position of the pointer 14 so that the user may be able to see the selected heating cycle even in a darkened room. The preferred illuminating arrangement in accordance with my invention is as shown in the drawings. The pointer 14 is made of a translucent material and preferably one having a high index of refraction, such as, for example, of fused quartz or of a plastic such as polymerized methyl methacrylate. The pointer may be made integrally with a U-shaped element 15 between the arms of which there is mounted a lamp 16. From the bottom of the U there projects an ear 17 which curves upward to form the pointer 14. The pointer 14 is mounted to cooperate with a scale 18 as shown in Fig. 2. Thus, light from the lamp 16 passing into the pointer at the bottom of the element 15 is transmitted through the ear 17 and up into the pointer 14 causing the latter to appear luminous. As shown in Figs. 2 and 3, the main light-receiving body of the pointer 15 and the illuminating system is preferably mounted within a casing so that only the ear 14 of the pointer projects through a narrow slot to the outside of the casing. The casing thus acts as shield for the illuminating means and the user of the device sees only the luminous glow of the pointer.

Interposed between the lamp 16 and the element 15 there may be placed a light filter 19. This is divided into a number of transparent sections, each of a different color. The element 19 in Fig. 1 of the drawing is lined to show the different colors. Suitable colors may, for example, be red, yellow, purple, green, blue and white, with the red at the "hot" end of the scale. It will thus be apparent that when the selector is positioned as shown in Fig. 1 the pointer 14 will glow with a white light while if the selector be positioned opposite one of the other sections of the filter 19, the pointer 14 will glow with the color corresponding to its position. The user of the blanket can, therefore, readily determine, without close inspection, the degree of heat which has been selected. The light filter 19 has been shown divided into a plurality of sections of different specified colors by way of example only. Other colors may be used. The color bands may overlap. Also, a continuously changing color band may be used. Similarly, sections or a band of a single color varying in color intensity may be employed. Any of these will make readily apparent to the blanket user the setting of the control device.

A further feature of my invention consists in an arrangement whereby a fluctuation of the intensity of illumination of the pointer indicates whether or not the heat cycling mechanism is functioning properly. This may be accomplished by the circuit illustrated in Fig. 1. A switch arm 20, shown in its open position, is arranged so that in its second position it will short circuit two contact studs 21 and 22. Contact 21 is connected to a low voltage winding 23 which may be wound in inductive relation to the motor field coil 9. The other end of winding 23 is connected in series with the lamp 16 to one terminal of a resistance 24. The second terminal of the latter is connected to contact 22. Thus, in the second position of the switch arm 20, the voltage produced by the winding 23 is applied to the lamp 16 in series with the resistance 24. With the switch arm 20 in the second position as just described, a circuit is simultaneously completed from the supply line through contact 22, resistance 24, contacts 4, 5 and conductor 2 to the blanket 1, and thence back to the supply through conductor 2'.

When the contacts 4 and 5 are open, the blanket 1 will, of course, be deenergized. However, when the contacts 4 and 5 are closed and current flows through the heating element in the blanket 1, a voltage drop occurs across resistor 24. This voltage drop is in opposite polarity to the voltage produced by the winding 23, so that the operating voltage applied across the terminals of the lamp 16 is reduced. The lamp, therefore, glows only dimly when the heating circuit is closed. When the heating circuit is opened by the opening of the contacts 4 and 5, the lamp 16 receives substantially the full voltage of the winding 23 and glows brightly. Thus, as the cycling cam 7 rotates, the lamp 16, and consequently the pointer 14 will be alternately brightly and dimly illuminated for proportionate periods of time depending upon the times during which the blanket is energized and deenergized. It will be evident from the foregoing description that the blanket user can determine at a glance not only the selected setting of the control device from the color with which the pointer 14 glows, but also from the fluctuation in the intensity of its illumination whether or not the system is operating properly.

It will be noted that my use of polymerized methyl methacrylate or similar material in the construction of the pointer 14 substantially eliminates room illumination such as might be objectionable under sleeping conditions. By properly shaping the outer surface 14 of the pointer, substantially no light will be transmitted through this surface into the room but nearly all the light will stay inside the pointer which will have only a soft glow.

In the event that the user of the blanket does not wish to have any light at all, I have provided an additional contact 25 forming a third position for the switch arm 20. In this position, the lamp 16 is disconnected and the supply line circuit through the arm 20 and contact 25 passes directly through resistor 24 and contacts 4 and 5 to the blanket 1, while at the same time the motor winding 9 is energized through a parallel circuit.

A modification of the operating circuit is shown in Fig. 4 in which similar elements are given the same reference numerals. Instead of supplying a separate winding in inductive relation to the motor field as in Fig. 1, the arrangement shown in Fig. 4 merely provides a tap 26 on the field winding 9. The lamp 16 is connected to the tap 26 and thence to terminal 27 of a three-position switch having a contact arm 28. The arm 28 is connected through resistance 24 to the end of winding 9 as well as to contact 5 of the cycling mechanism. An additional contact 29 in cooperative relation to the arm 28 is connected to one side of the supply line; the other side of the supply line is connected by conductor 30 to the other end of motor winding 9, as well as to one end of the heating element of blanket 1, through which the circuit is completed through contacts 4 and 5. Fig. 4 shows the switch arm 28 in the off position. In the second position of switch arm 28 the latter connects with both contacts 29 and 27 completing a circuit through contacts 4, 5 to the blanket 1, as well as connecting the lamp 16 across the low voltage tap 26 of winding 9 in series with resistance 24. Since the voltage drop in resistance 24 due to the flow of current through the heating element of the blanket 1 is in the opposite polarity from the voltage appearing across the tap portion of the winding 9, the lamp 16 will glow dimly. However, when contacts 4 and 5 open, the lamp will receive full voltage and will brighten. In the third position of switch arm 28, the latter makes connection only with contact 29. In this position a circuit is completed through the motor winding 9 and through contacts 4 and 5 to the heating element in the blanket 1, but the lamp 16 is disconnected entirely.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In a control apparatus for an electric heating device, the combination of a housing having an elongated aperture therein, an adjustable element movable with respect to said housing and having a U-shaped portion within said housing and an operating portion extending outside of said housing through said aperture for manual adjustment, said element being formed of a translucent material having a high index of refraction, illuminating means carried between the legs of said U-shaped portion, and a light filter disposed between said illuminating means and said element for varying the light transmission corresponding to adjustment of the position of said element.

2. In a control apparatus for an electric heating device, the combination of a housing having an elongated slot therein, an adjustable element movable with respect to said housing and having a U-shaped portion within said housing and an outwardly and upwardly extending portion extending outside of said housing through said slot, said element being formed of a translucent material having a high index of refraction, illuminating means carried between the legs of said U-shaped portion, and a light filter presenting progressively varying colors disposed between said illuminating means and said element and fixed in position with respect to said housing for varying the light transmission corresponding to adjustment of the position of said element.

JACOB W. McNAIRY.

REFERENCES CITED

The following references are of record in the file of this patent:

UNITED STATES PATENTS

| Number | Name | Date |
|---|---|---|
| 1,534,430 | Wells | Apr. 21, 1925 |
| 1,767,636 | Wilhjelm | June 24, 1930 |
| 1,771,237 | Van Reeth | July 22, 1930 |
| 1,797,772 | Hickman | Mar. 24, 1931 |
| 2,081,827 | Lohe | May 25, 1937 |
| 2,088,326 | Klopper | July 27, 1937 |
| 2,158,985 | Braswell | May 16, 1939 |
| 2,165,498 | Moody | July 11, 1939 |
| 2,165,569 | Obermaier | July 11, 1939 |
| 2,195,947 | Uhlrig | Apr. 2, 1940 |
| 2,195,958 | Kearsley | Apr. 2, 1940 |
| 2,290,278 | Failla | July 21, 1942 |
| 2,334,479 | Creager | Nov. 16, 1943 |
| 2,339,904 | Almquist | Jan. 25, 1944 |
| 2,433,124 | Johnson | Dec. 23, 1947 |
| 2,439,795 | Clark | Apr. 20, 1948 |
| 2,541,892 | Schulze | Feb. 13, 1951 |

FOREIGN PATENTS

| Number | Country | Date |
|---|---|---|
| 421,587 | Great Britain | Dec. 24, 1934 |